Dec. 3, 1968   W. L. CALVERT   3,413,898
SEAL BARRIERS FOR THERMOPLASTIC BAGS
Original Filed April 25, 1966
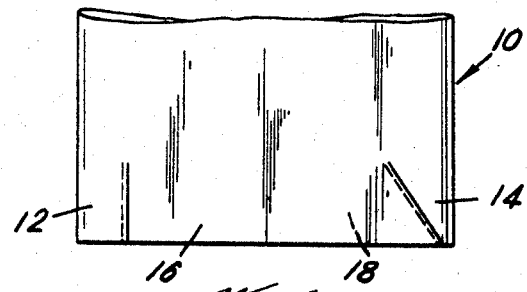
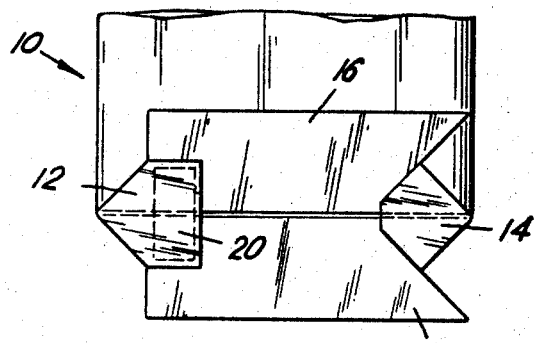
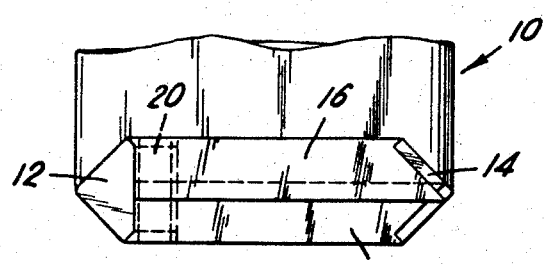
INVENTOR.
WILLIAM L. CALVERT 3,413,898
SEAL BARRIERS FOR THERMOPLASTIC BAGS
William L. Calvert, Westfield, N.J., assignor to Union
  Carbide Corporation, a corporation of New York
Original application Apr. 25, 1966, Ser. No. 545,099, now
  Patent No. 3,343,748, dated Sept. 26, 1967. Divided and
  this application June 27, 1967, Ser. No. 649,246
             7 Claims. (Cl. 93—35)

ABSTRACT OF THE DISCLOSURE

A method of providing a square-ended thermoplastic bag with a barrier material which bag has been pre-cut to form a square bag end having two sides flaps and two end flaps. The method comprises the steps of outfolding the side flaps, folding in the end flaps and inserting the barrier material under one of the end flaps. The barrier material is then sealed to the underside of the end flap. In a subsequent operation, a forming platen is inserted over one of the infolded end flaps and the side flap are folded over it and sealed to each other. Thereupon, the forming platen is removed and the side flaps are sealed to the end flap backed up by the barrier material.

---

This is a division of Ser. No. 545,099, filed Apr. 25, 1966, now U.S. Patent No. 3,343,748, issued Sept. 26, 1967.

This invention relates to thermoplastic industrial bags and formation of the ends thereof and more particularly to square-ended thermoplastic bags having a seal barrier which does not require removal from the bag.

Background of the invention

The manufacture of square-ended thermoplastic bags requires that each end of a bag be cut, folded and heat sealed in a particular configuration which will result in the desired rectangular, flat end when the bag is folded. Since the layers of film to be sealed overlie layers of film which must not be sealed, it is essential that some barrier be introduced between the two. Present day practice has been to form and seal the bottom of the bag around an internal platen which serves the barrier function. This platen is then withdrawn from the open top of the bag. The top of the bag is then formed and sealed around another internal platen and this platen is subsequently withdrawn from the valve opening of the bag. A major drawback of such a process is that the formation of both ends of the bag canont be accomplished simultaneously resulting in additional time and expense to the manufacturer of the bag.

Summary of the invention

Accordingly, it is an object of this invention to provide thermoplastic bags of the above type with a seal barrier which does not require removal from the bag.

In accordance with the present invention there is provided a method of providing a square-ended thermoplastic bag with a barrier material which bag has been pre-cut to form a square bag end having two side flaps and two end flaps. Such a method comprises outfolding the side flaps followed by infolding of the end flaps. Thereupon, a barrier material is inserted under at least one end flap. This barrier material is then sealed to the underside of the end flap. The method further includes placing a forming platen over at least one of the infolded end flaps and infolding the side flaps over the platen followed by sealing the side flaps to each other. Subsequent thereto, the forming platen is removed and the side flaps are sealed to the end flaps in the area backed up by the barrier material.

In the drawing:

FIG. 1 is a plan view partly broken away and partially in phantom of the end of a thermoplastic bag in one aspect of the invention.

FIG. 2 is a similar view of the bag of FIG. 1 illustrating the outfolded side flaps and the infolded end flaps with the barrier material in place.

FIG. 3 is a similar view of the bag of FIG. 2 illustrating the folded positions of the flaps upon the insertion of the barrier material.

Referring now to the drawing, there is shown in FIG. 3 a collapsed thermoplastic bag 10 having two infolded end flaps 12, 14 and two infolded side flaps 16, 18. Disposed beneath the end flap 12 is a piece of barrier film 20 which is heat sealed to the underside face of the end flap 12.

In accordance with the method of the present invention, as shown in FIG. 1, one end of a piece of tubular film is suitably cut to form a square bag end. Such cutting defines two end flaps 12, 14 and two side flaps 16, 18. FIG. 2 shows the next step in the method, which consists of opening up the side flaps 16, 18 and infolding the end flaps 12, 14. It is at this point in the method that the piece of barrier film 20 is inserted under end flap 12 and heat sealed through end flap 12, without sealing to the bag body 10, to the underside face of end flap 12 in the position shown. In a subsequent operation, a forming platen is inserted, the side flaps 16, 18 are infolded over it, and the main seals are made against this back up. Finally, the forming platen is removed and the final closing seal is made in the area backed up by the barrier film 20. FIG. 3 illustrates the position of the barrier film 20 in the completed bag.

Thus, by inserting a membrane of material which, because of its combined properties of heat capacity, thermal insulation, and resistance to melting or sticking, will allow sealing of film layers above it while preventing sealing of film layers below it; and which because of its low cost and its compatibility with the material and function of the bag, can be allowed to become a permanent part of the bag.

While it is preferred to use as the barrier film a laminate of polyethylene, which heat seals readily to end flap 12, and polypropylene, which does not heat seal to the under layers of the bag film, many other types of materials can be used as well including polyethylene coated polyethylene terephthalate, carboxyl containing olefin polymer coated aluminum foil, various kinds of paper, polypropylene, and polyethylene coated paper. The transparent films and laminates are favored when it is desired that the barrier film not show while, in other applications, there are obvious advantages in having the barrier film bear a printed message or a distinctive color for identification. Where printing covers the entire area under the seal, the ink itself has been found to be an adequate barrier against sealing through.

It is to be further noted that there are a great many configurations of cuts, folds, and seals which will form a desired bag end. It will be obvious to those skilled in the art that a barrier film can be incorporated in such configurations to perform substantially the same functions as described herein.

What is claimed is:

1. Method of providing a square-ended thermoplastic bag with a barrier material which bag has been pre-cut to form a square bag end having two side flaps and two end flaps which method comprises:
    (a) outfolding said side flaps;
    (b) infolding said end flaps;
    (c) inserting said barrier material under at least one end flap;
    (d) sealing said barrier material to the underside of said end flap;

(e) placing a forming platen over at least one of said infolded end flaps;
(f) infolding said side flaps over said platen and sealing said side flaps to each other, and
(g) removing said forming platen and sealing said side flaps to said end flap in the area backed up by said barrier material.

2. The method of claim 1 wherein said thermoplastic bag is polyethylene.

3. The method of claim 2 wherein said barrier material is a polyethylene-polypropylene laminate and wherein the polyethylene side of said laminate is sealed to the underside of said end flap.

4. The method of claim 2 wherein said barrier material is polyethylene coated polyethylene terephthalate.

5. The method of claim 2 wherein said barrier material is polypropylene.

6. The method of claim 2 wherein said barirer material is polyethylene coated paper and wherein the polyethylene side of said laminate is sealed to the underside of said end flap.

7. The method of claim 2 wherein said barrier material is carboxyl containing olefin polymer coated aluminum foil.

References Cited
UNITED STATES PATENTS 3,281,060   10/1966   Heimos et al. _____ 229—62.5
3,345,919   10/1967   Kasting et al. _____ 93—8

BERNARD STICKNEY, *Primary Examiner.*